(12) United States Patent
Hilliard et al.

(10) Patent No.: US 6,380,868 B1
(45) Date of Patent: Apr. 30, 2002

(54) PERMEABILITY-MODULATED CARRIER REFERENCING

(75) Inventors: Steven R. Hilliard, Burlington, NC (US); Geoffrey W. Hilliard, Signal Mountain, TN (US)

(73) Assignee: Inductive Signature Technologies, Inc., Knoxville, TN (US)

( * ) Notice: Subject to any disclaimer, the term of this patent is extended or adjusted under 35 U.S.C. 154(b) by 0 days.

(21) Appl. No.: 09/532,590

(22) Filed: Mar. 22, 2000

Related U.S. Application Data

(60) Provisional application No. 60/125,660, filed on Mar. 22, 1999.

(51) Int. Cl.⁷ .................................................. G08G 1/01
(52) U.S. Cl. ............................ 340/941; 340/933; 377/9
(58) Field of Search ................................ 340/933, 941, 340/934; 377/9

(56) References Cited

U.S. PATENT DOCUMENTS

| | | |
|---|---|---|
| 1,992,214 A | 2/1935 | Katz |
| 3,641,569 A | 2/1972 | Bushnell et al. |
| 3,873,964 A | 3/1975 | Potter |
| 3,927,389 A | 12/1975 | Neeloff |
| 3,984,764 A | 10/1976 | Koerner |
| 4,276,539 A | 6/1981 | Eshraghian et al. ......... 455/656 |
| 5,245,334 A | 9/1993 | Gebert et al. ................ 340/933 |
| 5,491,475 A | 2/1996 | Rouse et al. ................. 340/933 |
| 5,523,753 A | 6/1996 | Fedde ........................... 340/933 |
| 5,614,894 A | * 3/1997 | Stanczyk ..................... 340/933 |
| 5,861,820 A | 1/1999 | Kerner et al. ................ 340/934 |

\* cited by examiner

*Primary Examiner*—Daryl Pope
(74) *Attorney, Agent, or Firm*—Pitts & Brittian, P.C.

(57) ABSTRACT

An apparatus and method for measuring the inductance of a wire-loop without direct reference to any particular time-constant or frequency. Low-frequency noise induced into the wire-loop is canceled within the detector circuit and crosstalk between a plurality of adjacent wire-loops is nullified using passive transformers. New wire-loop configurations utilize the permeability-modulated carrier referencing to provide repeatable inductive signatures with less intrusive, and non-intrusive installations.

123 Claims, 11 Drawing Sheets

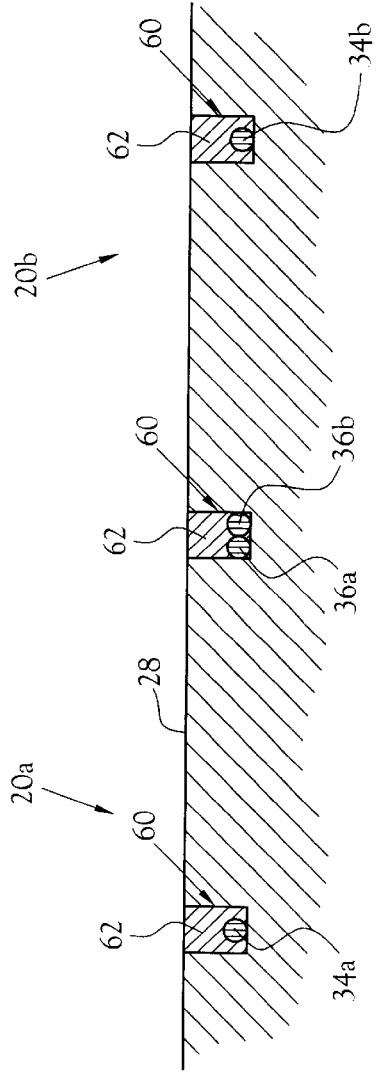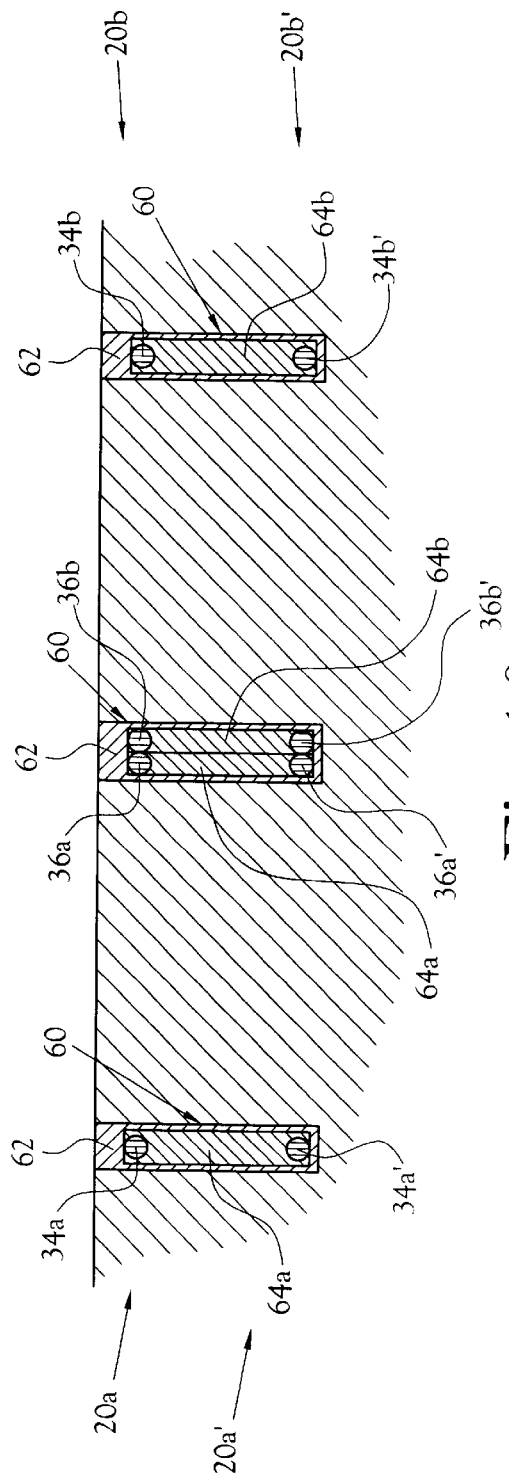

PERMEABILITY-MODULATED CARRIER REFERENCING

CROSS-REFERENCE TO RELATED APPLICATIONS

This application claims the benefit of U.S. Provisional Application No. 60/125,660, filed Mar. 22, 1999.

STATEMENT REGARDING FEDERALLY SPONSORED RESEARCH OR DEVELOPMENT

Not Applicable.

BACKGROUND OF THE INVENTION

1. Field of Invention

The present invention relates to an apparatus and method for the measurement of inductance. More precisely the present invention relates to an apparatus and method for the measurement of inductance of vehicles moving in a traffic lane using permeability-modulated carrier referencing.

2. Description of the Related Art

It is well known in the prior art to measure the inductance of a wire-loop, which is part of the frequency determining circuit of an inductance-capacitance-resistance ("LCR") oscillator, using frequency-counting techniques. Typically, the number of zero-crossings per time increment of the voltage across the terminals of the LCR capacitor is counted. Because the frequency of the LCR oscillator is inversely proportional to the square root of the inductance of the LCR circuit, changes in the inductance of the wire-loop are reflected in changes of the number of zero-crossing counted per time increment.

The Class-C wire-loop oscillator described in U.S. Pat. No. 3,873,964 issued to Thomas R. Potter on Mar. 25, 1975 is typical of LCR oscillators used in the prior-art. When a vehicle passes over a wire-loop connected to a running LCR oscillator, the metal of the vehicle changes the permeability of some of the space surrounding the wire-loop causing modulation of the carrier wave generated by the LCR oscillator. Changes in the inductance of the wire-loop caused by the vehicle are thus superimposed onto the LCR oscillator's carrier wave, yielding a permeability-modulated carrier. Next, the inductive signature is retrieved from the permeability-modulated carrier. One method of demodulating the carrier is the use of frequency counting techniques, such as with "signature cards" which are commercially available from 3M Corporation and Peek Traffic. The signature cards offer approximately a 100 Hz-sample rate, which is not fully adequate for demodulating the inductive signatures of vehicles moving at highway speeds.

IN THE BRIEF SUMMARY OF THE INVENTION

Another problem associated with the measurement of inductance in a wire-loop is crosstalk. Crosstalk between two or more wire-loops is a result of inductive coupling between the wire-loops, which results in energy transfer between the wire-loops when a changing current is flowing through them. If two wire-loops are operating at nearly the same frequency, then the energy transfer can result in an exaggerated buildup, or stagnation, of transferred energy in one LCR circuit, and a corresponding exaggerated energy depression in the other. This can cause the carrier waves of the two circuits to become entrained with each other in a more-or-less fixed phase differential and effectively eliminates the ability of the wire-loops to detect vehicles independently of each other. Typically, an inductive coupling coefficient of only a few percent is sufficient to cause complete entrainment. In prior-art vehicle detectors, carrier wave entrainment due to crosstalk is partially avoided by operating the oscillator circuits associated with the wire-loops at different frequencies, typically by varying the value of the capacitance, C, of the LCR circuit. This can prevent stagnation and entrainment, but does not address the underlying errors induced into each detector by the energy transfer due to mutual inductive coupling.

Accordingly, there is a need for an apparatus and method for measuring the changes in the inductance of a wire-loop caused by a vehicle traveling along a monitored roadway. The apparatus and method need be capable of measuring changes in the inductance of a wire-loop caused by a vehicle traveling at highway speeds. Further, the apparatus and method should be capable of measuring inductance without attempting to identify frequency changes. Finally, there is a need for an apparatus and method capable of measuring inductance using multiple inductive sensors without significant errors resulting from crosstalk.

Therefore, it is an object of the present invention to provide an apparatus and method for measuring changes in the inductance of a wire-loop caused by a vehicle traveling along a monitored roadway. is another object of the present invention to provide an apparatus and method for measuring changes in the inductance of a wire-loop caused by a vehicle traveling at highway speeds.

It is a further object of the present invention to provide an apparatus and method for measuring changes in the inductance of a wire-loop caused by a vehicle and producing an inductive signature for that vehicle.

It is yet another object of the present invention to provide an apparatus and method for measuring changes in the inductance of a wire-loop caused by a vehicle and producing an inductive signature of that vehicle by referencing a measured voltage to a permeability-modulated current carrier wave.

A still further object of the present invention is to provide an apparatus and method for measuring changes in the inductance of a wire-loop caused by a vehicle using multiple inductive sensors without significant errors resulting from crosstalk.

Another object is to provide an apparatus and method for measuring changes in the inductance of a wire-loop caused by a vehicle which does not need to be installed in the driving surface of a roadway.

BRIEF SUMMARY OF THE INVENTION

In a typical LCR circuit, a number of factors are related to the value of the inductance. For example, the frequency is inversely proportional to the square root of the inductance, L. This relationship is a consequence of the direct dependence of the instantaneous rate of change in current flow, $\delta I$, upon the value of the inductance. Accordingly, frequency is only an indirect indication of this more general relationship because the circuit voltage, V, is in turn a function of current, I, and capacitance, C. A more direct indication of inductance in an LCR oscillator is the amplitude of the current function, I(t), which is inversely proportional to the inductance of the LCR circuit. The changing current function, I(t), in the LCR circuit of an inductive vehicle detector is a permeability-modulated carrier. This carrier is modulated in both frequency and amplitude by the changing apparent permeability of the space surrounding a wire-loop caused by the motion of a nearby metallic object, typically an automotive vehicle. It should be noted that induced electromagnetic noise, such as from high voltage power lines, also effectively modulates the current function carrier wave. However, the induced noise modulates the voltage function, V(t), in an asymmetric manner by shifting the voltage function on the magnitude axis. Because the modulation resulting from the induced noise affects the current flow and the voltage function differently, the permeability-modulated current carrier function, I(t), can be cross-referenced with the voltage function, V(t), to isolate the desired inductance from the induced noise. This method of isolating the inductance is known as permeability-modulated carrier referencing (PMCR). PMCR is particularly effective at removing low-frequency induced noise from an inductance measuring circuit. Those skilled in the art will recognize that although PMCR is described herein with reference to an LCR oscillator, the principles are equally applicable to other forms of carrier functions including, but not limited to, pulsed-type discrete cycle inductance measurement techniques.

Another factor affecting the performance of the present invention is crosstalk wherein the direction of current flow in an inductor determines the direction of the induced differential current flow in inductors that are inductively coupled to it. One method of reducing crosstalk is to nullify the underlying mutual inductive coupling of a plurality of wire-loops using passive transformers. The passive transformer inductively couples the inductors in precisely the opposite polarity and magnitude in which they were originally coupled nullifying the original coupling and eliminating the potential for crosstalk at the source. In addition to removing the gross errors introduced by crosstalk, nullification of the inductive coupling also removes the more subtle transient errors in the detectors, which appear as non-repeatable errors in recorded inductive signatures.

A single-turn wire-loop spanning the width of one or more traffic lanes is sufficient to detect the speed, the direction, the lane position, and the wheelbase dimensions for any vehicle passing over the wire-loop. The speed and the lateral lane position of a vehicle are unambiguously determined if the two active legs of the wire-loop span the traffic lanes at different skew angles. Symmetric skew angles also produce useful data, but are ambiguous in resolving the vehicle direction. Similar skew angles are unable to resolve the lane position; however, this is not as important for single traffic lanes as it is for multiple traffic lanes. Finally, zero skew angles can produce speed and axle-count data, but are ambiguous in resolving vehicle direction, can not resolve the lane position or the width of the wheelbase, and are ambiguous with respect to vehicle continuity when multiple traffic lanes are involved.

For multi-lane traffic, a pair of single-turn wire-loops in a complimentary wedge-shaped configuration is ideal for collecting the maximum unambiguous traffic-flow data. This configuration is a hybrid of rectangular wire-loops and blades which gives repeatability of signatures that is characteristic of the blades along with the less-intrusive installation that is characteristic of simple wire-loops. Shallow saw-cuts are desirable for a traffic sensor spanning long distances in a pavement surface to prevent the formation of a shear-plane and slot faulting.

A large-aperture wire-loop can detect metallic objects at great distances. The magnetic field generated by a wire-loop is highly directional at a significant distance from the wire-loop. More precisely, a wire-loop is most sensitive to distant objects in the same plane as the wire-loop and sensitivity decreases as the object moves away from the plane of the wire-loop. At a significant distance, objects approaching the plane perpendicular to that of the wire-loop are virtually invisible to the wire-loop. This directional sensitivity of the wire-loop is useful in determining the relative direction to detected objects in a similar way as a radar antenna is directional. Large-aperture wire-loops are used in non-intrusive vehicle-detecting applications because they do not need to be embedded in or laid on the pavement to detect passing vehicles.

DESCRIPTION OF THE SEVERAL VIEWS OF THE DRAWINGS

The above-mentioned features of the invention will become more clearly understood from the following detailed description of the invention read together with the drawings in which:

FIG. 9 illustrates a cross-section of the wire-loop pair illustrated in FIGS. 7 and 8;

FIG. 10 illustrates a cross-section of an alternate embodiment of the wire-loop vehicle detector having two pair of substantially parallel and concentric wire-loops which are vertically separated from one another configured as illustrated in FIGS. 7 and 8;

DETAILED DESCRIPTION OF THE INVENTION

An apparatus and method for measuring the inductance of a wire-loop without direct reference to any particular time-constant or frequency is illustrated generally at 10 in the figures. The apparatus 10 utilizes permeability-modulated carrier referencing to identify the inductive signature of a vehicle passing over a wire-loop.

In a typical LCR circuit, a number of factors are related to the value of the inductance. For example, the frequency is inversely proportional to the square root of the inductance, L. This relationship is a consequence of the direct dependence of the instantaneous rate of change in current flow, δI, upon the value of the inductance as defined in the following equation:

$$\delta I = V/L \qquad (1)$$

Accordingly, frequency is only an indirect indication of this more general relationship because the circuit voltage, V, is in turn a function of current, I, and capacitance, C, as defined in the following equation:

$$\delta V = I/C \qquad (1)$$

A more direct indication of inductance in an LCR oscillator is the amplitude of the current function, I(t), which is inversely proportional to the inductance of the LCR circuit. The changing current function, I(t), in the LCR circuit of an inductive vehicle detector is a permeability-modulated carrier. This carrier is modulated in both frequency and amplitude by the changing apparent permeability of the space surrounding a wire-loop caused by the motion of a nearby metallic object, typically an automotive vehicle. It should be noted that induced electromagnetic noise, such as from high voltage power lines, also effectively modulates the current function carrier wave. However, the induced noise modulates the voltage function, V(t), in an asymmetric manner by shifting the voltage function on the magnitude axis. Because the modulation resulting from the induced noise affects the current flow and the voltage function differently, the permeability-modulated current carrier fiction, I(t), can be cross-referenced with the voltage function, V(t), to isolate the desired inductance signature from the induced noise. This method of isolating the inductance signature is known as permeability-modulated carrier referencing (PMCR). PMCR is particularly effective at removing low-frequency induced noise from an inductance measuring circuit. Those skilled in the art will recognize that although PMCR is described herein with reference to an LCR oscillator, the principles are equally applicable to other forms of carrier functions including, but not limited to, pulsed-type discrete cycle inductance measurement techniques.

Figure 1:
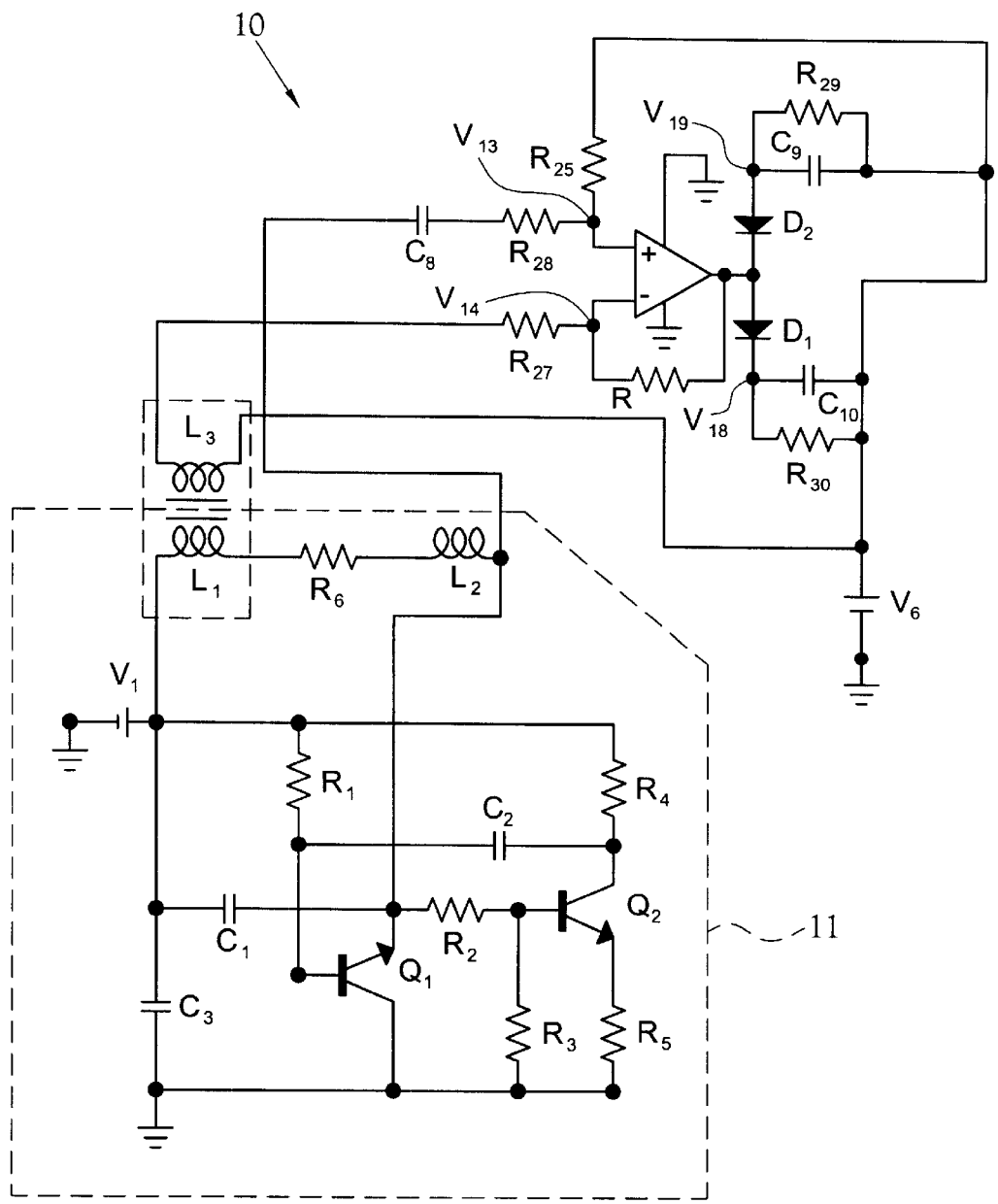
FIG. 1 is a schematic diagram of an inductance measuring circuit of the preferred embodiment of the present invention.

FIG. 1 illustrates a circuit diagram of one embodiment of the present invention for PMCR. The illustrated embodiment includes a class-C oscillator 11 connected to signal conditioning electronics. Using the signal conditioning electronics, a high sample rate relative to prior-art vehicle detectors is achieved by measuring the amplitude modulation of the voltage, V(t), and changing current, I(t), rather than measuring frequency changes. Those skilled in the art will recognize that other oscillators could be substituted for the class-C oscillator 11 shown without interfering with the objects and advantages of the present invention.

Figure 2:
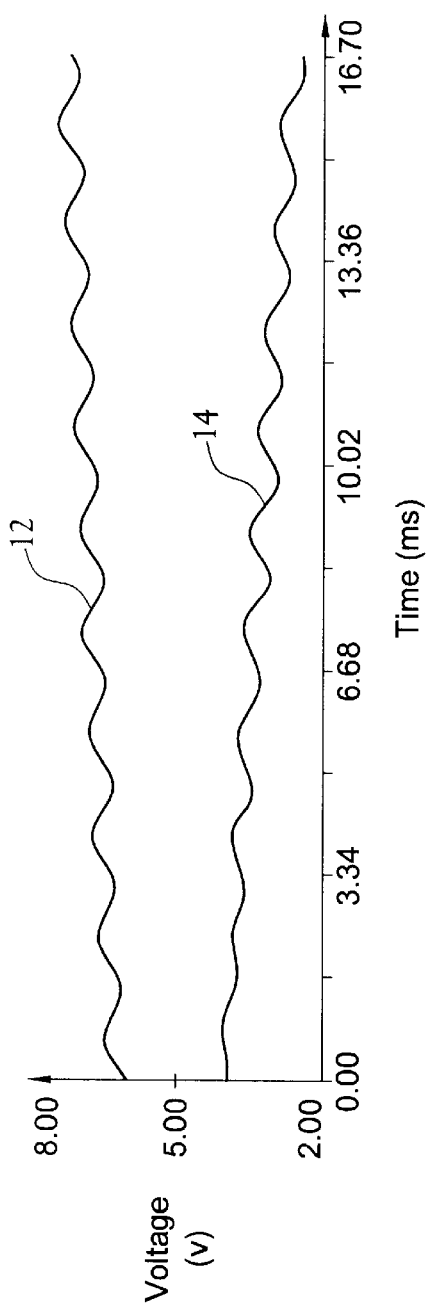
FIG. 2 is a plot of the raw waveform data produced by a circuit simulation of the inductance measuring circuit of FIG. 1.
Figure 3:
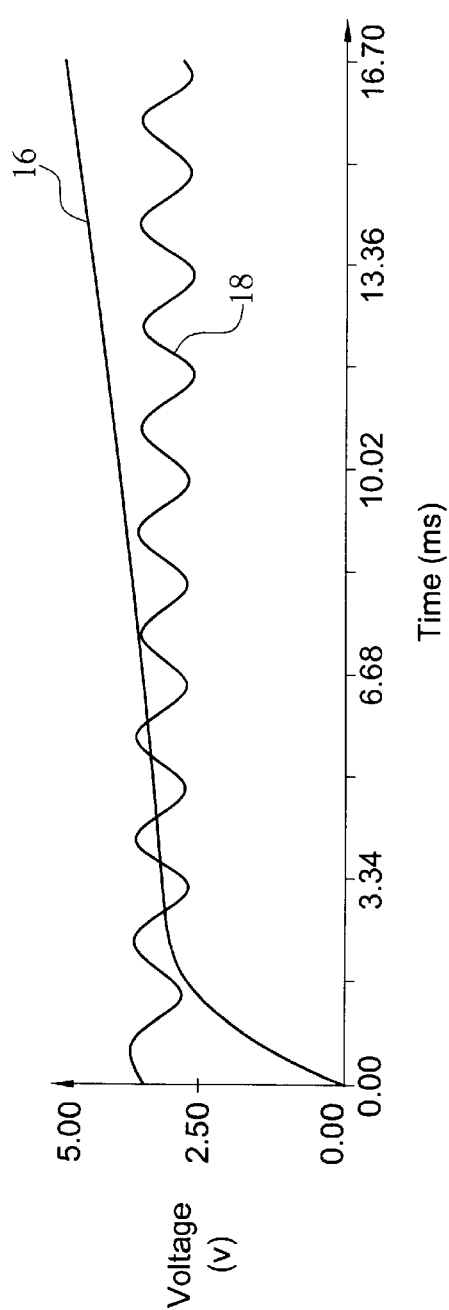
FIG. 3 is a plot of the mixed waveform data produced by a circuit simulation of the inductance measuring circuit of FIG. 1.
Figure 4:
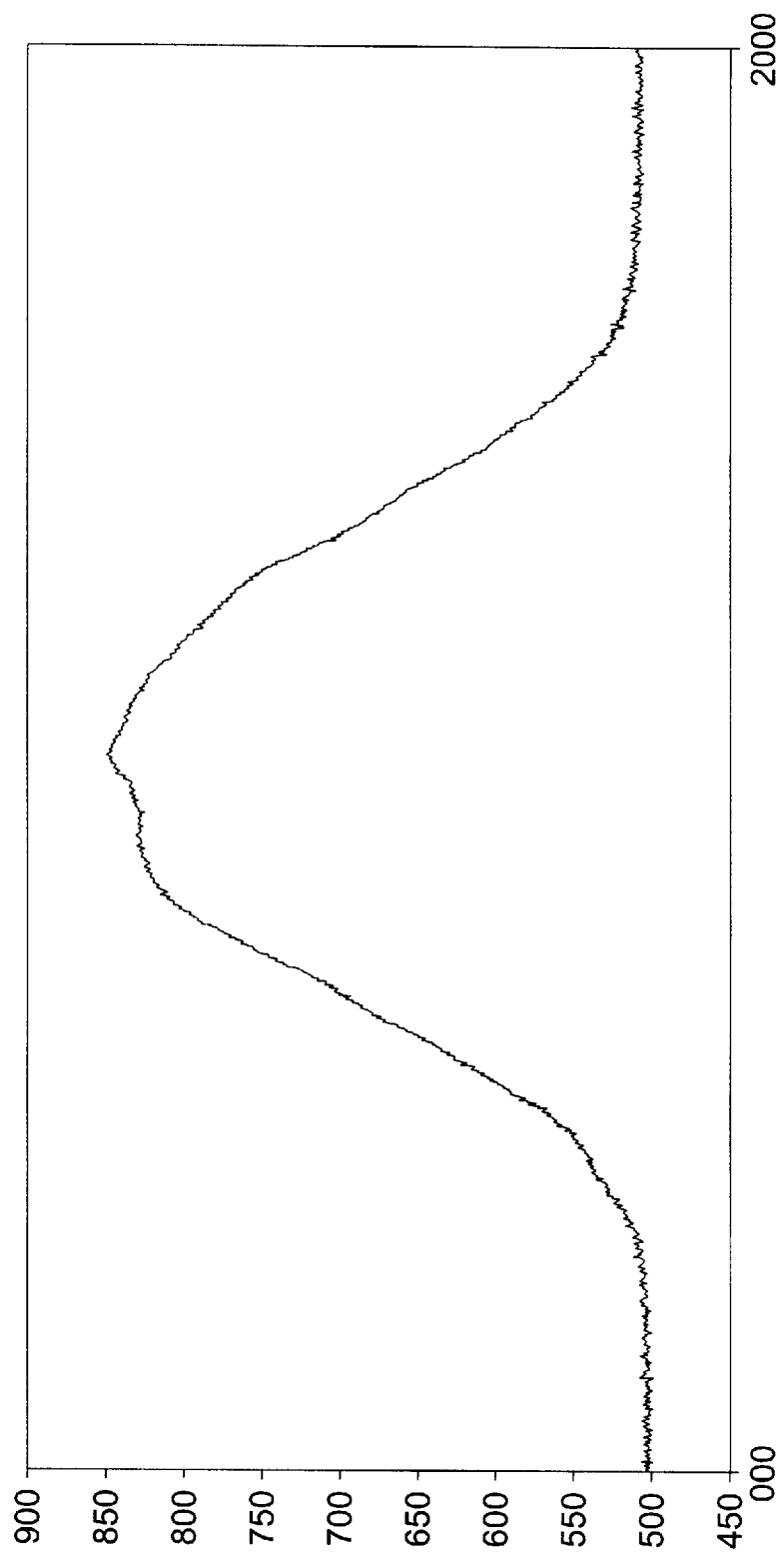
FIG. 4 is an inductive signature recorded for a vehicle using one embodiment of the present invention.

FIGS. 2 and 3 represent the output obtained from the circuit of FIG. 1. Cancellation of the noise induced into the wire-loop is achieved by mixing two signals generated by the circuit of FIG. 1: $V_{18}$ and $V_{19}$. Specifically, FIG. 2 illustrates the raw voltage of $V_{18}$ in a first plot 12 and $V_{19}$ in a second plot 14. $V_{13}$ represents the voltage function output from the oscillator 11 while $V_{14}$ represents the current function. At the output of the oscillator 11, the current function and the voltage function are 90° out of phase. However, by inductively coupling the inductor $L_3$ with the inductor $L_1$, the phase of the current function $V_{14}$ is altered such that it coincides with that of the voltage function $V_{13}$. FIG. 3 illustrates a first plot 16 of $V_{19}$ subtracted from $V_{18}$ overlaid with a second plot 18 of $V_{19}$ added to $V_{18}$. By subtracting $V_{19}$ from $V_{18}$ the noise is canceled and the inductance signal is increased showing the changing inductance. Conversely, by adding these two functions as in the second plot 18, the inductance signal is canceled and only the noise remains which may be useful for analysis or for referencing in additional noise-cancellation steps downstream. Those skilled in the art will recognize that although PMCR is shown here using an oscillator, the principles taught herein can be applied to an alternate embodiment of the present invention such as where the wire-loop is driven by an impulse carrier signal rather than a free-running oscillator. Finally, by referencing the permeability-modulated current carrier to the voltage and removing the induced noise, an inductive signature, such as that illustrated in FIG. 4, representative of a vehicle is produced.

Figure 5:
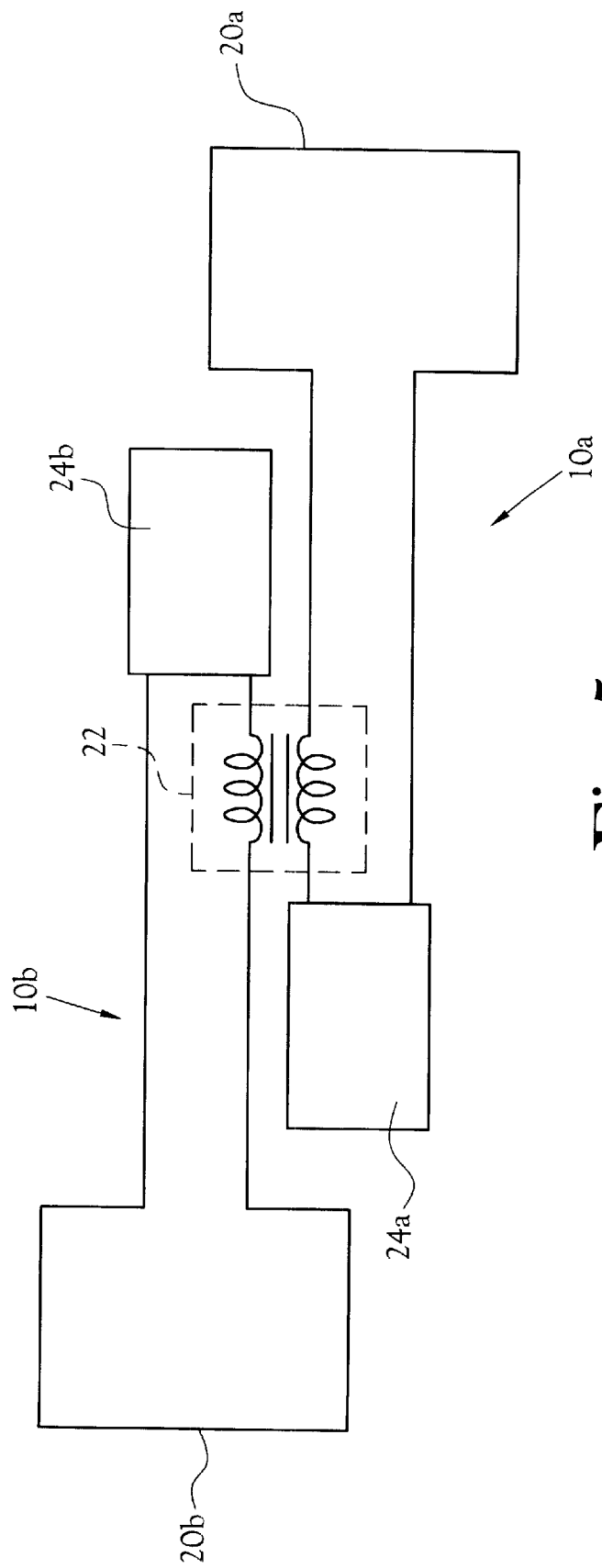
FIG. 5 is a schematic diagram of a passive transformer wired for crosstalk nullification between two wire-loops.

Another factor affecting the performance of the present invention is crosstalk. One method of reducing crosstalk is to nullify the underlying mutual inductive coupling of a plurality of wire-loops 20 using passive transformers 22. Because the direction of current flow in an inductor determines the direction of the induced differential current flow in inductors which are inductively coupled to it, a passive transformer 22 inductively linking the wire-loops 20a, 20b which are connected to inductive signature detection circuits 24a, 24b is used, as illustrated in FIG. 5. The passive transformer 22 inductively couples the inductors in precisely the opposite polarity and magnitude in which they were originally coupled. This has the effect of nullifying the original coupling and eliminating the potential for crosstalk at the source. In addition to removing the gross errors introduced by crosstalk, nullification of the inductive coupling also removes the more subtle transient errors in the detectors which appear as non-repeatable errors in recorded inductive signatures.

Figure 6:
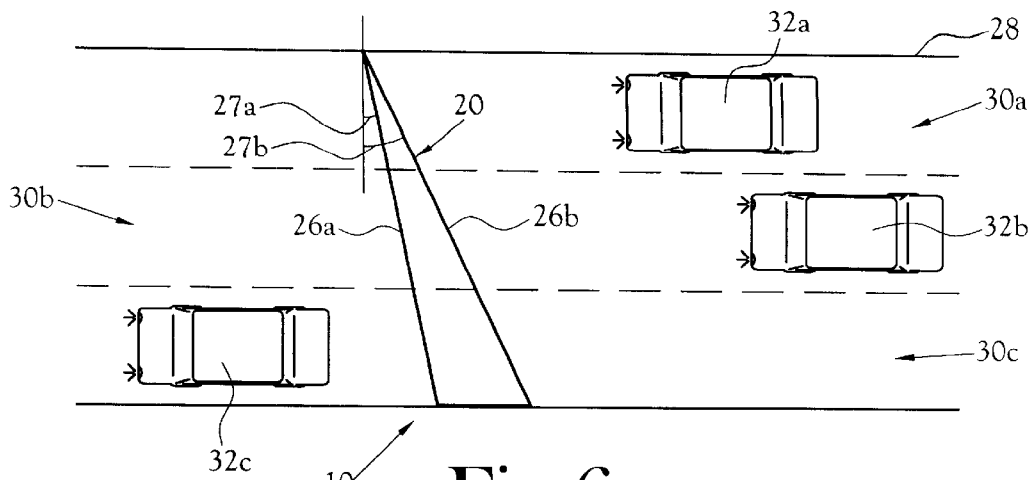
FIG. 6 depicts a single wire-loop deployed in the preferred wedge-shape configuration across three lanes of traffic for maximum data resolution.

A single-turn wire-loop spanning the width of one or more traffic lanes 30 of a roadway 28 is sufficient to detect the speed, the direction, the lane position, and the wheelbase dimensions for any vehicle 32 passing over the wire-loop. The speed and the lateral lane position of a vehicle 32 are unambiguously determined if the two active legs 26a, 26b of the wire-loops 20 span the traffic lanes 30 at different skew angles 27a, 27b as illustrated in FIG. 6. In the preferred embodiment, the configuration of each wire-loop 20 is deployed in a wedge-shaped configuration defining an acute triangle. Other embodiments of the present invention which include symmetrically skewed legs, and parallel skewed legs of the single wire-loop are contemplated but are not preferred. Symmetric skew angles also produce useful data, but are ambiguous in resolving the vehicle direction. Similar skew angles are unable to resolve the lane position; however, this is not as important for single traffic lanes as it is for multiple traffic lanes. Finally, zero skew angles can produce speed and axle-count data, but are ambiguous in resolving vehicle direction, can not resolve the lane position or the width of the wheelbase, and are ambiguous with respect to vehicle continuity when multiple traffic lane are involved.

Figure 7:
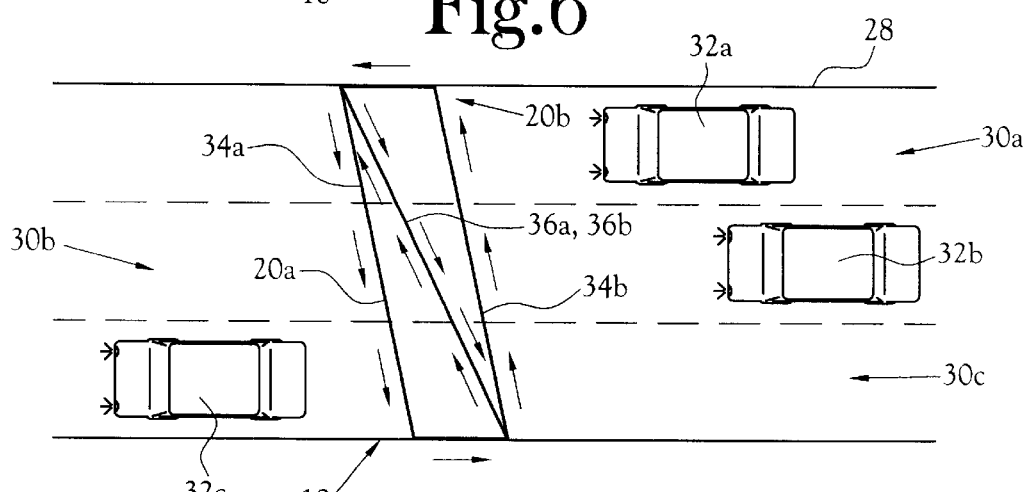
FIG. 7 depicts a pair of complimentary wedge-shaped configuration wire-loops deployed across three lanes of traffic with opposing current flow to nullify the magnetic field of the two common legs.
Figure 8:
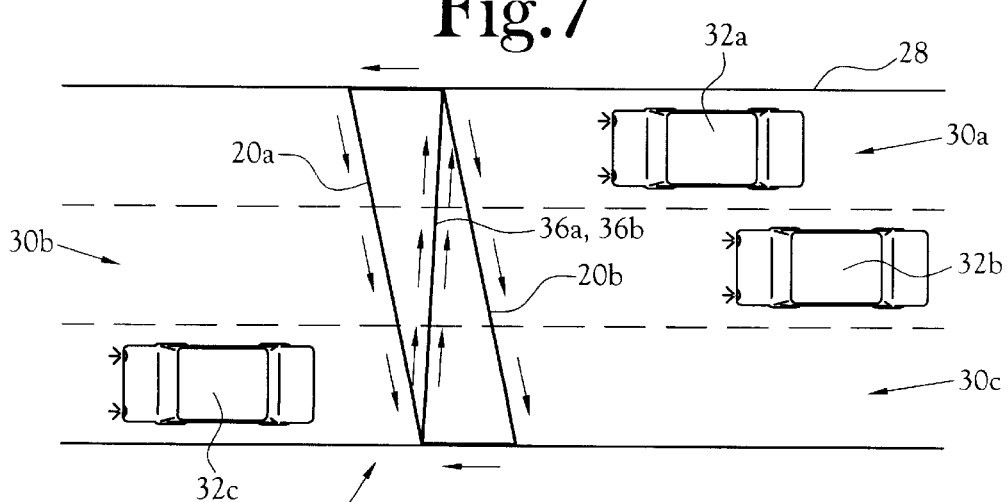
FIG. 8 depicts a pair of complimentary wedge-shaped configuration wire-loops deployed across three lanes of traffic with complimentary current flow to accentuate the magnetic field of the two common legs.

For multi-lane traffic, a pair of single-turn wire-loops in the preferred embodiment of FIGS. 7 and 8 is ideal for collecting the maximum unambiguous traffic-flow data. Specifically, the wire-loop wedges 20 are deployed in a complimentary configuration such that the outer legs 34a, 34b are approximately parallel and the inner legs 36a, 36b are coincidental. In the wedge-shaped configuration, two legs 34, 36 of each wedge traverse the width of the roadway 28, preferably at two different skew angles 27a, 27b. The depth to which the wire is embedded in the pavement is the minimum depth consistent with reliable performance over time. Because thermal expansion of the pavement applies tensile stress to long wires which are embedded in it, it is preferred that the depth of the saw-cuts oscillate slightly in order to allow the pavement to expand without breaking the wires embedded therein. This configuration is a hybrid of rectangular wire-loops and blades which gives repeatability of signatures that is characteristic of the blades along with the less-intrusive installation that is characteristic of simple wire-loops. Shallow saw-cuts are desirable for a traffic sensor spanning long distances in a pavement surface to prevent the formation of a shear-plane and slot faulting. If the two wire-loops 20 are energized so that current flows as illustrated in FIG. 7, then the magnetic fields generated by the common center legs 36 of the wire-loops 20 cancel and the signatures recorded are the difference between the perturbations of the magnetic fields from the outside legs 34. Conversely, if the two wire-loops 20 are energized so that current flows as illustrated in FIG. 8, then the magnetic fields generated by the common center 36 legs of the wire-loops 20 combine making the common center legs 36 the dominant detection zone for the configuration.

FIG. 9 clearly illustrates the relative position of the legs 34, 36 of the wire-loops 20 as shown in FIGS. 7 and 8. Specifically, FIG. 9 illustrates a cross-section of the roadway 28 showing the slots 60 cut into the pavement for receiving the wire-loops 20. A filler material 62 is used to seal the slots and hold the wire-loops 20 in position.

FIG. 10 illustrates an alternate embodiment of a wire-loop configuration using two pair of wire-loops 20, 20' represented by legs 34, 36 and 34', 36'. The first pair 20 and second pair 20' of wire-loops are concentric and disposed in parallel, vertically separated planes. To maintain adequate vertical separation, a spacing member 64 is disposed between the first pair 20 and second pair 20' of wire-loops. Those skilled in the art will recognize that the spacing member 64 can be a separate member which is insertable between the wire-loop pairs or integrally formed with the wire-loop pairs to provide the desired separation without interfering with the objects and advantages of the present invention.

Separately energizing the wire-loops 20 produces still different results with the inductance depending upon the vehicle's lane of travel. For example, in FIG. 7, if the first wire-loop 20a is energized, but the second wire-loop 20b is not, then the measured inductance strength is dependent upon the vehicle's lane of travel, increasing from the first lane 30a to the third lane 30c. Conversely, if the second wire-loop 20b is energized and the first wire-loop 20a is not, then the measured inductance strength decreases from the first lane 30a to the third lane 30c. By selectively energizing two or more wire-loops 20 in these various sensing configurations, a number of useful data points are produced. Multiple vehicle signatures recorded when more than one vehicle is being simultaneously sensed by the wire-loop are separated using deduction and linear algebra to solve the multiple simultaneous equations generated.

In the preferred embodiment of the present invention, each wheel of a vehicle 32 is detected as it rolls over each of the two road-traversing legs of the wedge-shaped wire-loop 20. For example, a four-wheel passenger vehicle 32 will produce eight distinct wheel spikes as it rolls over the wire-loop. Knowledge of the timing of the wheels spike events combined with the known geometry of the wire-loop 20 and the assumed rectangular geometry of the vehicle's wheelbase allows for the unambiguous derivation of the traffic parameters sought. The magnitude of the wheel spikes or other parameters of the vehicle are used for vehicle classification or for re-identification downstream and may be desirable in alternate embodiments.

In the preferred embodiment of the present invention, two time-stamps are detected for each wheel that rolls over the sensor; one for each leg of the wire-loop which spans the traffic lane. A four-wheel passenger vehicle for example, generates eight time-stamps as it passes over the wire-loop. In one embodiment, each time-stamp is expressed as a 16-bit integer resulting in a 16-byte description of the vehicle passing over the wire-loop. More information which would be useful for downstream re-identification of the vehicle could be collected if desired, such as the wheel-spike amplitude, the body profile, etc. For large traffic flows, it is highly desirable for a traffic sensor to produce compact records on a per-vehicle basis to minimize the data storage requirements.

Figure 11:
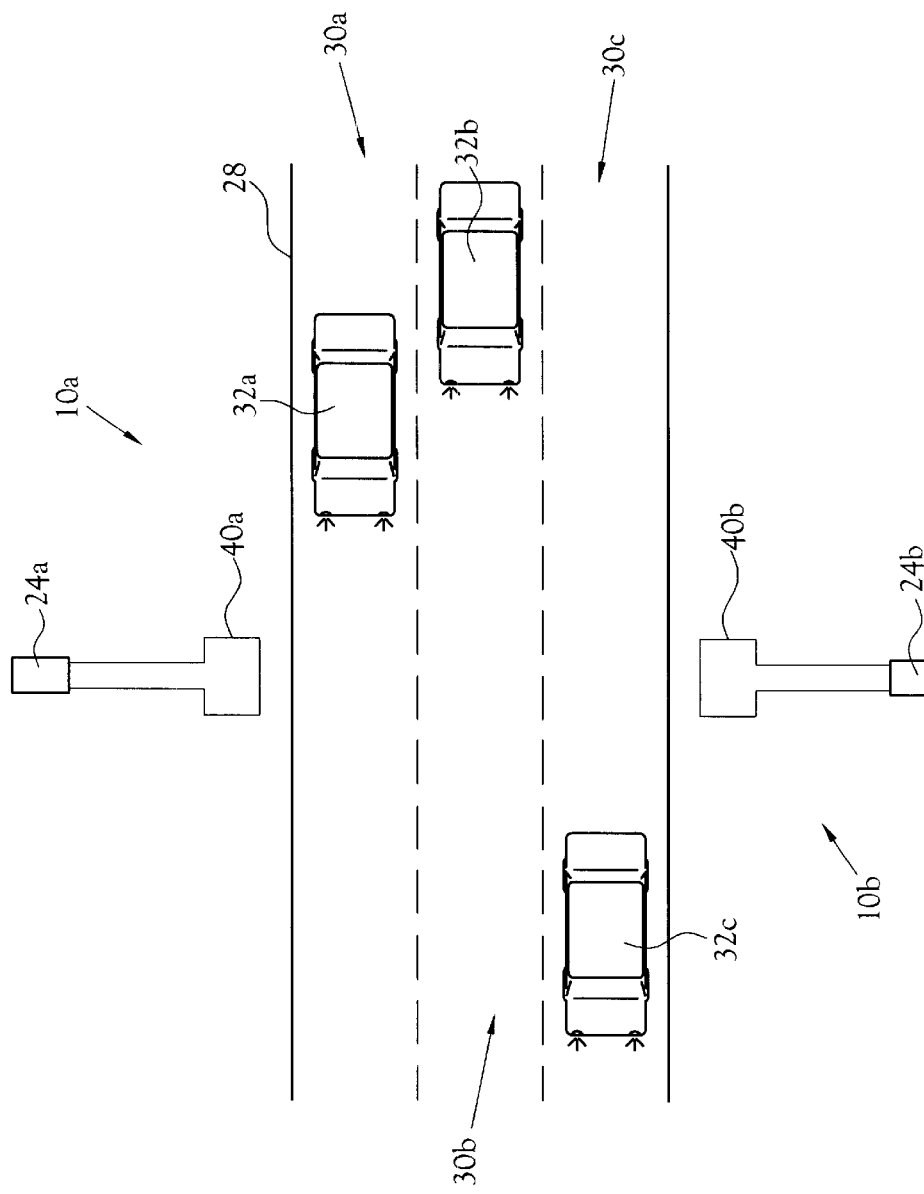
FIG. 11 depicts a non-intrusive wire-loop vehicle detector deployed in a horizontal configuration.
Figure 12:
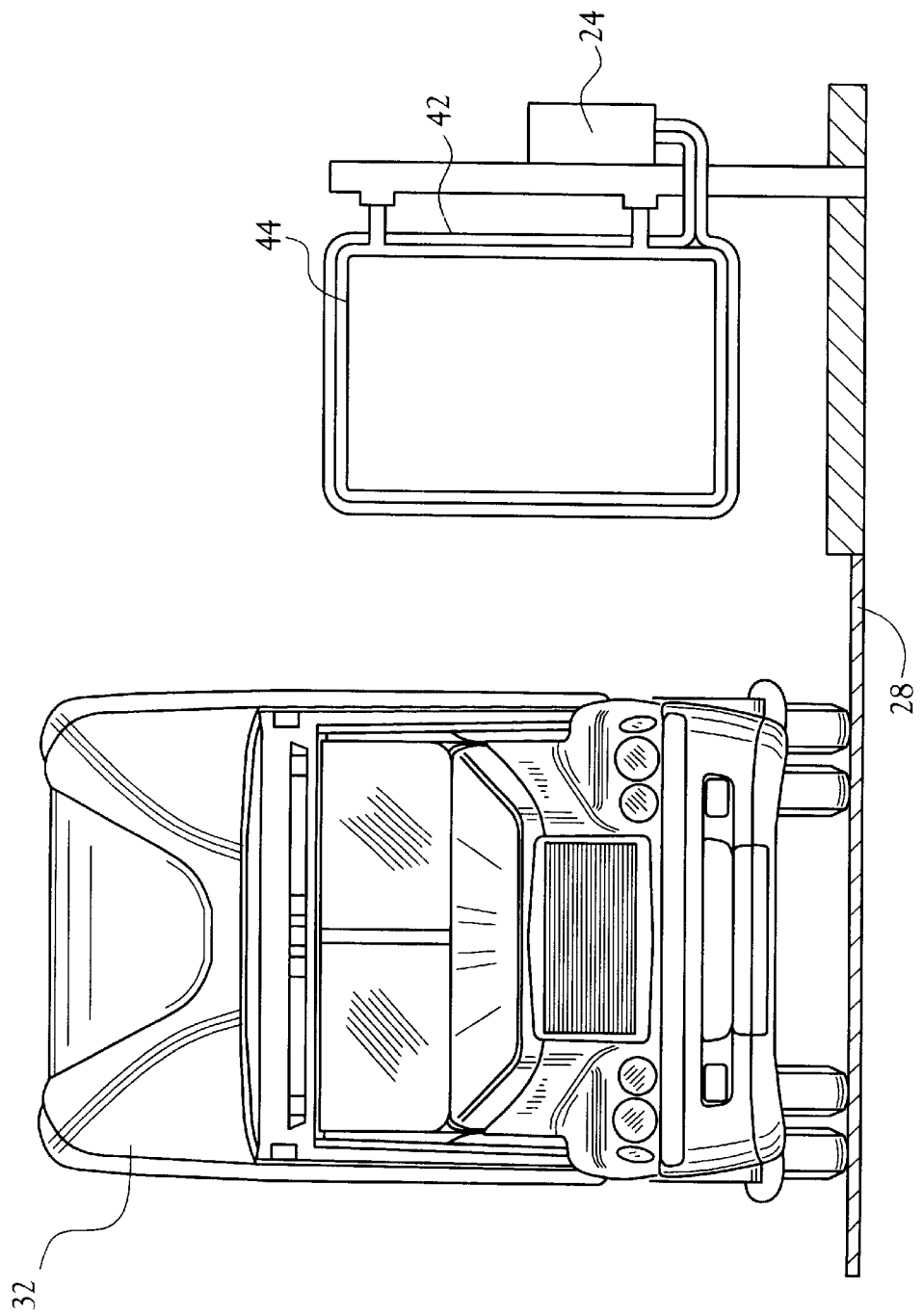
FIG. 12 depicts one embodiment of a non-intrusive wire-loop vehicle detector deployed in a vertical configuration.
Figure 13:
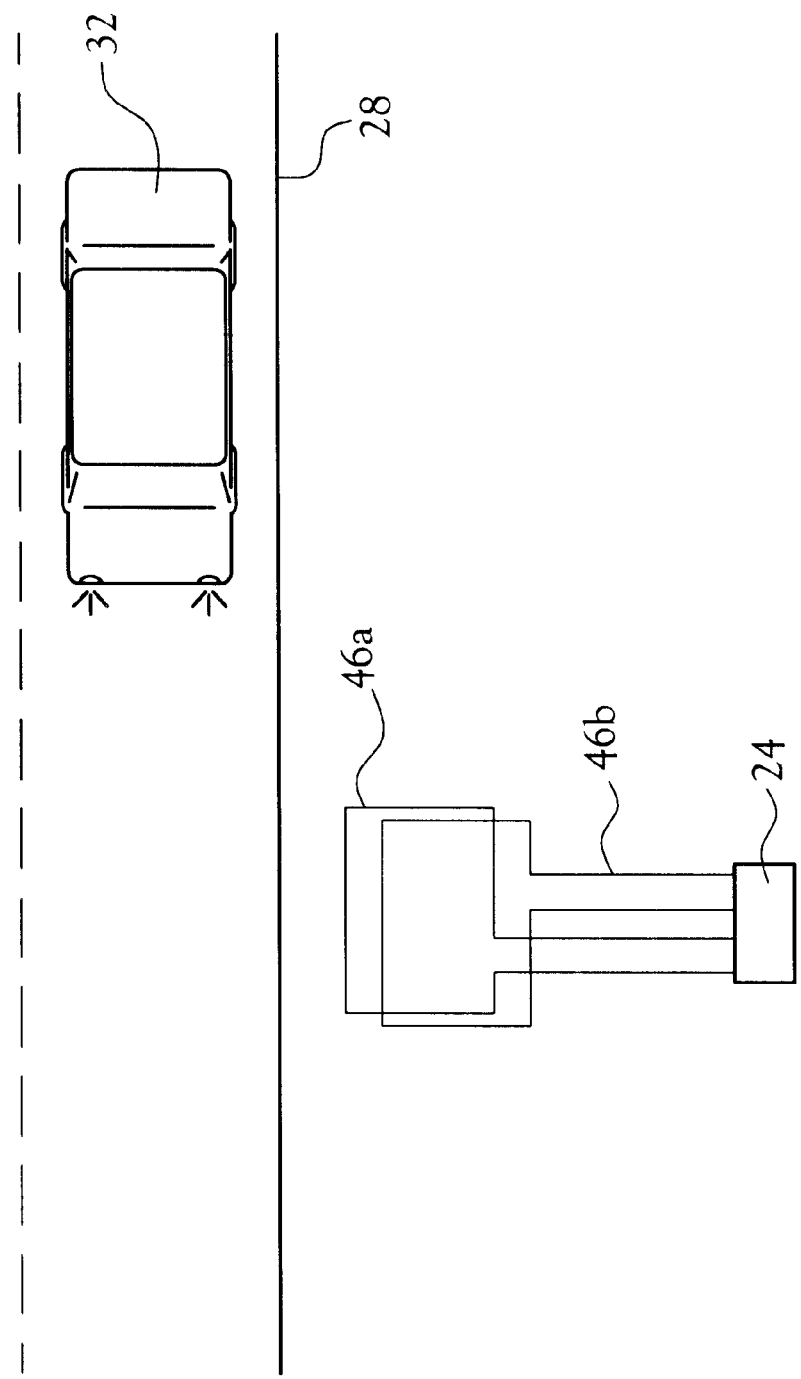
FIG. 13 depicts an alternate embodiment of a non-intrusive wire-loop vehicle detector having a pair of horizontally oriented wire-loops.

Referring now to FIGS. 11 through 13, a large-aperture wire-loop can detect metallic objects at great distances. The magnetic field generated by a wire-loop is highly directional at a significant distance from the wire-loop. More precisely, a wire-loop is most sensitive to distant objects in the same plane as the wire-loop and sensitivity decreases as the object moves away from the plane of the wire-loop. At a significant distance, objects approaching the plane perpendicular to that of the wire-loop are virtually invisible to the wire-loop. This directional sensitivity of the wire-loop is useful in determining the relative direction to detected objects in a similar way as a radar antenna is directional. Accordingly, large-aperture wire-loops are useful in non-intrusive vehicle-detecting applications because they do not need to be embedded in or laid on the pavement to detect passing vehicles.

The large-aperture wire-loops may be deployed in a number of configurations. FIG. 11 illustrates a single large-aperture wire-loop 40 deployed in a horizontal orientation on each side of the roadway. Using a single loop 40, the presence of a vehicle is detected when proximate the wire-loop but additional information such as the lane of travel is unavailable. However, by employing two loops 40a, 40b, the relative inductance measured at each loop 40 is used to identify the lane of travel. FIG. 12 illustrates a single large-aperture wire-loop 42 deployed in a vertical orientation adjacent a roadway. The wire-loop is shaped around a loop-forming member 44. FIG. 13 illustrates a pair of large-aperture wire-loops 46a, 46b deployed on one side of a roadway. The centers of the wire-loops 46a, 46b are offset such that one wire-loop 46a is closer to the roadway 28 than the other 46b. In the illustrated embodiment, the wire-loops are offset in the direction of travel along the roadway to clearly show that two separate wire-loops exist; however, such offset is not necessary for operation. The illustrated configuration produces a differential between the relative inductance measured by the inductive sensor 10 allowing additional information such as the lane of travel to be identified. Those skilled in the art will recognize that principles of the teachings of the present invention can be applied to the non-intrusive large aperture wire-loop configurations without interfering with the objects of the present invention.

Figure 14:
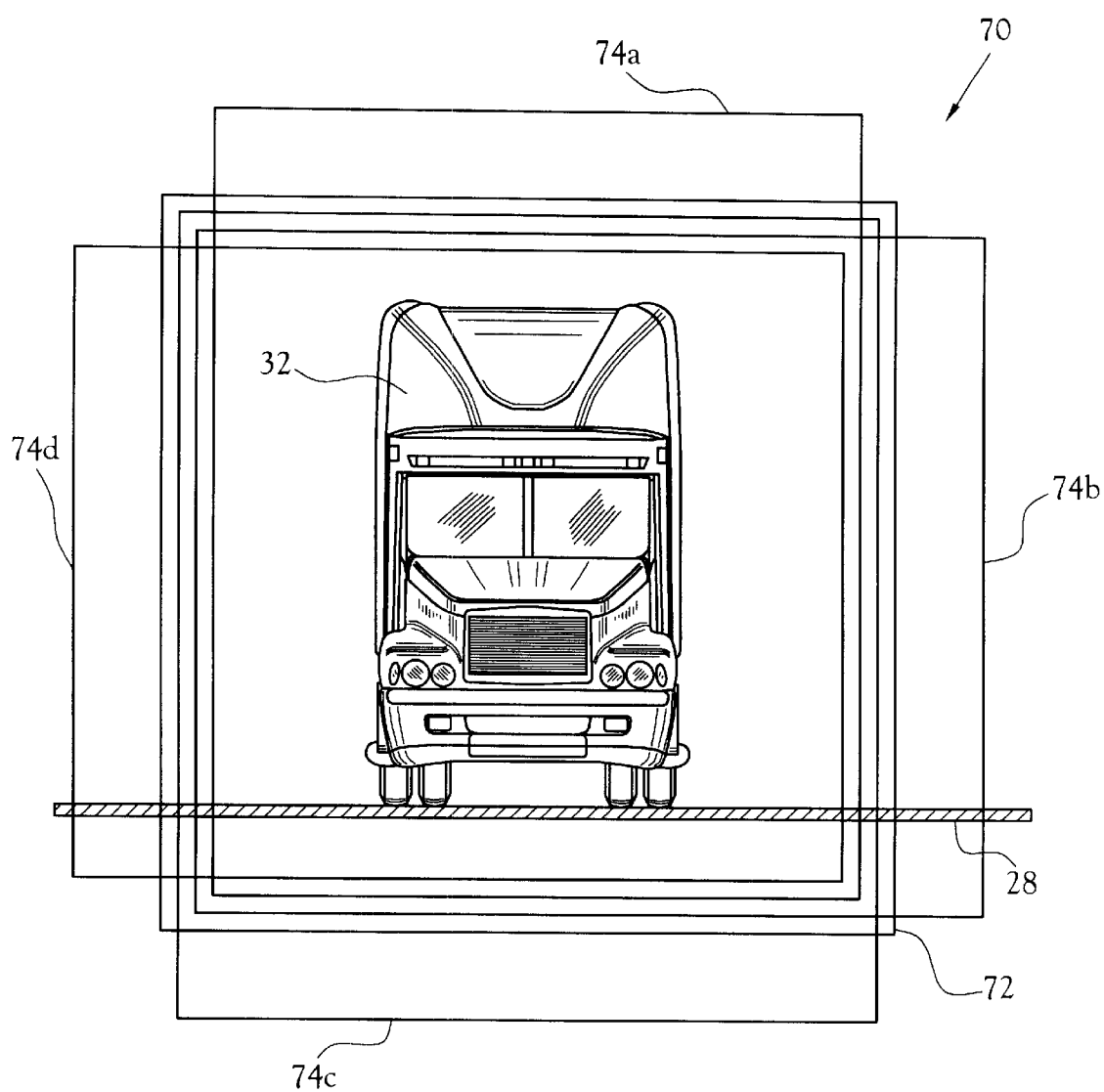
FIG. 14 illustrates a pass-through wire-loop configuration.

FIG. 14 illustrates a pass-through wire-loop configuration 70. The pass-through configuration 70 includes a central wire-loop 72 deployed such that the vehicle passes through the center of the open wire-loop. At least one additional outer wire-loop 74 is deployed in conjunction with the central wire-loop 72. Each outer wire-loop 74 has a first dimension which is substantially equal to the corresponding dimension of the central wire-loop 72 and a second dimension which is larger than the corresponding dimension of the central wire-loop 72. Each outer wire-loop 74 is disposed so that it coincides with the central wire-loop 72 on three sides. The fourth side of the outer wire-loop 74 and the central wire-loop 72 are offset by the difference in the dimensions. In the illustrated embodiment, four outer wire-loops 74a–74d are used. By selectively energizing one of the outer wire-loops 74a–74d and the central wire-loop 72, the changing inductance is measured from any one of the four orientations allowing additional information to be obtained about the vehicle. Such a pass through detector 70 is also useful for walk-through metal detectors to identify not only the presence of a metal object, but also the relative location of the object. Although not shown in FIG. 14, those skilled in the art will recognize various methods and apparatuses for maintaining the shape and position of the wire-loops used in the pass-through configuration. Further, those skilled in the art will recognize that any of the teachings of the present invention can be applied to the pass through configuration without interfering with the objects of present invention.

Figure 15:
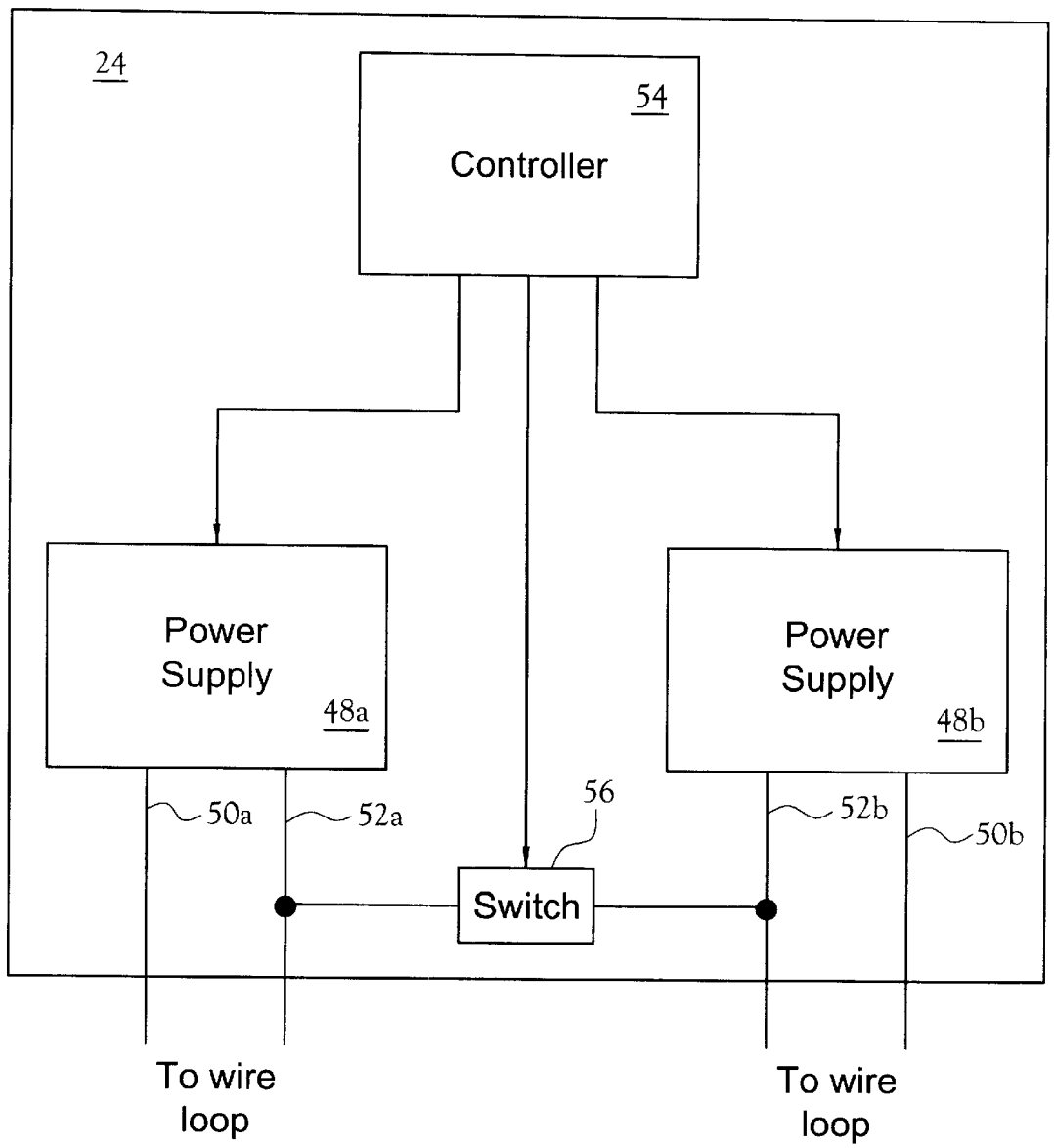
FIG. 15 illustrates a block diagram of one embodiment of a control box of the wire-loop vehicle detector of the present invention.

FIG. 15 illustrates a block diagram of the control box 24 configured for use with a pair of wire-loops 20. In the illustrated embodiment, the control box 24 contains a power supply 48 for each of the pair of wire-loops 20. Each power supply 48 is responsive to a controller 54. The controller 54 directs the operation of the power supplies 48 to selectively energize the corresponding wire-loop 20. Each power supply 48 is capable of reversing the polarity of the outputs 50, 52 thereby allowing the controller 54 to dictate the direction of current flow through the wire-loops. Further, the control box 24 includes a switch 56 that serially connects the wire-loops 20 to present a single current path. This allows the wire-loops 20 to be joined thereby equalizing the apparent inductance and preventing any divergence in phase angle. In the illustrated embodiment, the switch 56 is responsive to the controller 54; however, those skilled in the art will recognize that the linking of the wire-loops can be accomplished in a number of ways without interfering with the objects and advantages of the present invention.

Accordingly, an apparatus and method for measuring the inductance of a wire-loop without direct reference to any particular time-constant or frequency has been disclosed. By comparing the permeability-modulated current carrier function, I(t), with the voltage function, V(t), changes in the inductance of a wire-loop caused by a vehicle passing over a wire-loop are isolated. Crosstalk is nullified using passive transformers. For inductance detection, a pair of single-turn wire-loops are deployed in a complimentary wedge-shaped configuration for collecting the maximum unambiguous traffic-flow data. By selectively energizing each wire-loop, a variety of traffic-flow data can be measured. Finally, the apparatus and method disclosed herein permits the use of large-aperture wire-loops in non-intrusive vehicle-detecting applications.

While a preferred embodiment has been shown and described, it will be understood that it is not intended to limit the disclosure, but rather it is intended to cover all modifications and alternate methods falling within the spirit and the scope of the invention as defined in the appended claims.

What is claimed is:

1. An inductive sensor for use in a roadway having a surface and a width, the roadway defining at least one traffic lane, said inductive sensor comprising:

at least one wire-loop defining a first leg, a second leg, and a third leg, each of said first leg and said second leg having a length so as to be substantially deployed across the roadway width, said first leg deployed across the roadway at a first angle relative to an edge of the roadway, said second leg deployed across the roadway at a second angle relative to an edge of the roadway, and said third leg connecting said first leg and said second leg; and at least one power source in communication with said at least one wire-loop.

2. The inductive sensor of claim 1 wherein said at least one wire-loop is oriented substantially parallel to the roadway surface.

3. The inductive sensor of claim 1 wherein said first angle and said second angle are not equal.

4. The inductive sensor of claim 1 further comprising a controller in communication with said at least one power source for selectively energizing each of said at least one wire-loop.

5. The inductive sensor of claim 1 wherein said at least one power source produces an output having a polarity, said power source being capable of reversing the polarity of the output.

6. The inductive sensor of claim 1 having a pair of wire-loops.

7. The inductive sensor of claim 6 wherein said first legs and said third legs form opposing sides of a quadrilateral.

8. The inductive sensor of claim 6 wherein said first legs and said third legs form opposing sides of a parallelogram.

9. The inductive sensor of claim 6 further comprising a second pair of wire-loops disposed substantially parallel to a first said pair of wire-loops, said first pair of wire-loops and said second pair of wire-loops being substantially concentric.

10. The inductive sensor of claim 1 wherein each of said at least one wire-loop defines an independent current path.

11. The inductive sensor of claim 1 further comprising at least one switch selectively connecting one of said at least one wire-loop to another said at least one wire-loop in series to define a single current path.

12. The inductive sensor of claim 1 wherein said at least one wire-loop is disposed substantially parallel to the roadway surface.

13. The inductive sensor of claim 1 wherein said first angle is not equal to said second angle.

14. An inductive sensor for use in a roadway having a surface and a width, the roadway defining at least one traffic lane, said inductive sensor comprising:

a first wire-loop deployed within the roadway;

a second wire-loop deployed within the roadway, wherein said second wire-loop is located proximate to said first wire-loop such that a mutual inductive coupling exists between said first wire-loop and said second wire-loop; and a passive transformer having a first coil in communication with said first wire-loop and a second coil in communication with said second wire-loop, said passive transformer inductively coupling said first wire-loop with said second wire-loop, said passive transformer selected to substantially nullify the mutual inductive coupling.

15. An apparatus for detecting a vehicle travelling on a roadway having a width and defining at least one traffic lane and a path of vehicular travel, said apparatus comprising:

a first wire-loop substantially spanning the width of the roadway and defining a current path;

a second wire-loop substantially spanning the width of the roadway and defining a current path, said second wire-loop current path being independent of said first wire-loop current path;

a first oscillator circuit in communication with said first wire-loop;

a second oscillator circuit in communication with said second wire-loop; and a controller in communication with at least one of said first oscillator circuit and said second oscillator circuit, said controller for selectively energizing at least one of said first oscillator circuit and said second oscillator circuit.

16. The apparatus of claim 15 wherein said controller is in communication with each of said first oscillator and said second oscillator.

17. The apparatus of claim 15 further comprising a vehicle detection circuit in communication with said controller.

18. The apparatus of claim 17 wherein a plurality of vehicles travelling on said roadway are detected simultaneously by said vehicle detection circuit which produces a composite inductive signature, said composite inductive signature being separated into individual vehicle inductive signatures through subsequent processing.

19. The apparatus of claim 15 wherein said controller is in communication with said first oscillator circuit and a further controller is in communication with said second oscillator circuit.

20. The apparatus of claim 15 wherein a current flows through each of said first wire-loop and said second wire-loop in a selected direction when each of said first wire-loop and said second wire-loop is energized, said controller being capable of switching said direction of current flow through at least one of said first wire-loop and said second wire-loop.

21. The apparatus of claim 15 further comprising a switch in communication between said first wire-loop and said second wire-loop, said switch connecting said first wire-loop and said second wire-loop in a single current path when closed and separating said first wire-loop current path from said second wire-loop current path when open.

22. The apparatus of claim 15 wherein said first wire-loop and said second wire-loop are substantially coplanar and each of said first wire-loop and said second wire-loop define at least one leg, one of said at least one leg of said first wire-loop abutting said one of said at least one leg of second wire-loop to define a common leg.

23. The apparatus of claim 22 wherein a first current flows through said first wire-loop in a first direction thereby producing a first magnetic field and a second current flows through said second wire-loop in a second direction thereby producing a second magnetic field, said second direction being opposite said first direction such that said first magnetic field destructively interferes with said second magnetic field along said common leg.

24. The apparatus of claim 23 wherein said first current is substantially equal in magnitude to said second current.

25. The apparatus of claim 22 wherein a first current flows in said first wire-loop in a first direction thereby producing a first magnetic field and a second current flows in said second wire-loop in a second direction thereby producing a second magnetic field, said second direction being substantially identical to said first direction such that said first magnetic field constructively interferes with said second magnetic field along said common leg.

26. The apparatus of claim 25 wherein said first current is substantially equal in magnitude to said second current.

27. The apparatus of claim 15 further comprising:

a third oscillator circuit;

a third wire-loop that is substantially concentric with said first wire-loop, said third wire-loop disposed at a greater depth than said first wire-loop with respect to the roadway surface, said third wire-loop being in communication with said third oscillator circuit;

a fourth oscillator circuit in communication with said controller; and a fourth wire-loop that is substantially concentric with said second wire-loop, said fourth wire-loop disposed at a greater depth than said second wire-loop with respect to the roadway surface, said fourth wire-loop being in communication with said fourth oscillator circuit;

wherein said controller is in communication with at least one of said first oscillator circuit, said second oscillator circuit, said third oscillator circuit and said fourth oscillator circuit, said controller for selectively energizing at least one of said first oscillator circuit, said second oscillator circuit, said third oscillator circuit and said fourth oscillator circuit.

28. The apparatus of claim 27 wherein said first wire-loop and said second wire-loop are substantially coplanar and said third wire-loop and said fourth wire-loop are substantially coplanar, said first wire-loop abutting said second wire-loop to define a first common leg and said third wire-loop abutting said fourth wire-loop to define a second common leg.

29. The apparatus of claim 28 wherein a third current flows in said third wire-loop in a third direction thereby producing a third magnetic field and a fourth current flows in said fourth wire-loop in a fourth direction thereby producing a fourth magnetic field, said third direction being opposite said fourth direction such that said third magnetic field destructively interferes with said fourth magnetic field along said common leg.

30. The apparatus of claim 29 wherein said third current is substantially equal in magnitude to said fourth current.

31. The apparatus of claim 28 wherein a third current flows in said third wire-loop in a third direction thereby producing a third magnetic field and a fourth current flows in said fourth wire-loop in a fourth direction thereby producing a fourth magnetic field, said third direction being substantially identical to said fourth direction such that said third magnetic field constructively interferes with said fourth magnetic field along said common leg.

32. The apparatus of claim 31 wherein said third current is substantially equal in magnitude to said fourth current.

33. A wire-loop sensor for sensing changes in inductance caused by vehicular traffic on a roadway, the roadway having a width and a surface and defining at least one traffic lane and a path of vehicular travel, said wire-loop sensor comprising:

a first leg;

a second leg substantially spanning the width of the roadway at a first angle relative to said first leg; and a third leg substantially spanning the width of the roadway, said third leg being not parallel to said second leg.

34. The wire-loop sensor of claim 33 wherein said second leg and said third leg are disposed substantially parallel to the roadway surface.

35. The wire-loop sensor of claim 33 wherein said first leg electrically connects said second leg and said third leg.

36. The wire-loop sensor of claim 33 wherein said first leg is located outside of each at least one traffic lane.

37. The wire-loop sensor of claim 33 wherein said first leg is located proximate to an edge of at least one traffic lane.

38. An inductive sensor deployed in a roadway for use with a vehicle detector, the roadway having a width and defining at least one traffic lane, a path of vehicular travel and a reference line having a major component substantially perpendicular to the path of vehicular travel, said inductive sensor comprising:
- a first leg substantially spanning the width of the roadway, said first leg deployed at a first angle relative to the reference line;
- a second leg substantially spanning the width of the roadway, said second leg deployed at a second angle relative to the reference line; and
- a third leg in communication with said second leg;
- wherein said first leg is in communication with one of said second leg and said third leg.

39. The inductive sensor of claim 38 wherein said first angle is not equal to said second angle.

40. The inductive sensor of claim 38 wherein each of said first angle and said second angle is between the angle perpendicular to the reference line and the angle parallel to the reference line.

41. The inductive sensor of claim 38 wherein each of said first angle and said second angle is an acute angle.

42. The wire-loop sensor of claim 38 wherein said first leg and said second leg are disposed substantially parallel to the roadway surface.

43. An inductive sensor deployed in a roadway for use with a vehicle detector, the roadway having a width and defining a path of vehicular travel, said inductive sensor comprising:
- a first wire-loop including at least a first leg, a second leg and a third leg in communication so as to define a current path, said first leg and said second leg each having one end located proximate to a first reference point located on a side of the roadway, said first wire-loop first leg deployed at a first angle relative to the path of vehicular travel, said first wire-loop second leg deployed at a second angle relative to the path of vehicular travel; and
- a second wire-loop including at least a first leg, a second leg and third leg in communication so as to define a current path, said first leg and said second leg each having one end located proximate to a second reference point located on the opposite side of the roadway from said first reference point, said second wire-loop first leg deployed at a third angle relative to the path of vehicular travel, said second wire-loop second leg deployed at a fourth angle relative to the path of vehicular travel.

44. The inductive sensor of claim 43 wherein said first angle is not equal to said second angle and said third angle is not equal to said fourth angle.

45. The inductive sensor of claim 43 wherein said first angle is substantially equal to said third angle and said second angle is substantially equal to said fourth angle.

46. The inductive sensor of claim 43 wherein said first wire-loop first leg is substantially parallel to said second wire-loop first leg and said first wire-loop second leg is substantially parallel to said second wire-loop second leg.

47. The inductive sensor of claim 43 wherein said first wire-loop second leg is substantially parallel to and substantially abuts said second wire-loop second leg.

48. The inductive sensor of claim 43 wherein said first wire-loop current path is independent of said second wire-loop current path.

49. The inductive sensor of claim 43 wherein said first wire-loop current path and said second wire-loop current path form a single current path.

50. The inductive sensor of claim 43 further comprising a switch in communication between said first wire-loop and said second wire-loop, said switch electrically connecting said first wire-loop and said second wire-loop to form a single current path when closed and electrically isolating said first wire-loop and said second wire-loop to form separate current paths when open.

51. The inductive sensor of claim 43 further comprising a controller in communication each of said first wire-loop and said second wire-loop, said controller for selectively energizing each of said first wire-loop and said second wire-loop.

52. The inductive sensor of claim 43 further comprising a controller in communication each of said first wire-loop and said second wire-loop, said controller for controlling a phase relationship between a first current flowing in said first wire-loop and a second current flowing in said second wire-loop.

53. The inductive sensor of claim 43 wherein the roadway further defines a surface, said first wire-loop and said second wire-loop being disposed substantially parallel to the roadway surface.

54. The inductive sensor of claim 43 wherein said first wire-loop is substantially coplanar with said second wire-loop.

55. The inductive sensor of claim 43 wherein said first wire-loop is driven by a first current to produce a first magnetic field and said second wire-loop is driven by a second current to produce a second magnetic field.

56. The inductive sensor of claim 55 wherein one of said first wire-loop first leg and said first wire-loop second leg substantially abuts one of said second wire-loop first leg and said second wire-loop second leg to define a common leg.

57. The inductive sensor of claim 56 wherein said first current and said second current travels through said common leg in opposite directions such that said first magnetic field destructively interferes with said second magnetic field along said common leg.

58. The inductive sensor of claim 56 wherein said first current and said second current travels through said common leg in identical directions such that said first magnetic field constructively interferes with said second magnetic field along said common leg.

59. The inductive sensor of claim 43 further comprising:
- a third wire-loop including at least a first leg, a second leg and a third leg in communication so as to define a current path, said first leg and said second leg each having one end located proximate to a third reference point located on a side of the roadway, said third wire-loop first leg deployed at a fifth angle relative the path of vehicular travel, said third wire-loop second leg deployed at a sixth angle relative to the path of vehicular travel, said third wire-loop being disposed below and substantially concentric with said first wire-loop; and
- a fourth wire-loop including at least a first leg, a second leg and a third leg in communication so as to define a current path, said first leg and said second leg each having one end located at a fourth reference point located on the opposite side of the roadway from said third reference point, said fourth wire-loop first leg deployed at a seventh angle relative to the path of vehicular travel, said fourth wire-loop second leg deployed at a eighth angle relative to the path of vehicular travel, said fourth wire-loop being disposed below and substantially concentric with said second wire-loop.

60. The inductive sensor of claim 59 wherein said first wire-loop is substantially coplanar with said second wire-loop and said third wire-loop is substantially coplanar with said fourth wire-loop.

61. The inductive sensor of claim 59 wherein said first wire-loop is driven by a first current to produce a first magnetic field, said second wire-loop is driven by a second current to produce a second magnetic field, said third wire-loop is driven by a third current to produce a third magnetic field and said fourth wire-loop is driven by a fourth current to produce a fourth magnetic field.

62. The inductive sensor of claim 61 wherein said first current, said second current, said third current and said fourth current are alternating currents, said first current and said third current being phase-locked at a first frequency and said second current and said fourth current being phase-locked at a second frequency.

63. The inductive sensor of claim 61 wherein one of said first wire-loop first leg and said first wire-loop second leg substantially abuts one of said second wire-loop first leg and said second wire-loop second leg to define a first common leg and one of said third wire-loop first leg and said third wire-loop second leg substantially abuts one of said fourth wire-loop first leg and said fourth wire-loop second leg to define a second common leg.

64. The inductive sensor of claim 63 wherein said first current and said second current flow through said first common leg in opposite directions and said third current and said fourth current flow through said second common leg in opposite directions such that said first magnetic field destructively interferes with said second magnetic field and said third magnetic field destructively interferes with said fourth magnetic field.

65. The inductive sensor of claim 63 wherein said first current and said second current flow through said first common leg in substantially identical directions and said third current and said fourth current flow through said second common leg in substantially identical directions such that said first magnetic field constructively interferes with said second magnetic field and said third magnetic field constructively interferes with said fourth magnetic field.

66. An apparatus for detecting a vehicle travelling on a roadway having a width and defining a path of vehicular travel, said apparatus comprising:
 a vehicle detection circuit;
 a first sensor configured in a substantially triangular arrangement including a first wire segment, a second wire segment substantially spanning the width of the roadway at a first angle relative to said first wire segment and a third wire segment substantially spanning the width of the roadway at second angle relative to said first wire segment wherein said first wire segment, said second wire segment and said third wire segment form a current path, said first sensor in communication with said vehicle detection circuit; and
 a second sensor configured in a substantially triangular arrangement including a fourth wire segment substantially spanning the width of the roadway, a fifth wire segment and a sixth wire segment substantially spanning the width of the roadway at a third angle relative to said fifth wire segment, said fourth wire segment disposed at a fourth angle relative to said fifth wire segment wherein said fourth wire segment, said fifth wire segment and said sixth wire segment form a current path, said second sensor in communication with said vehicle detection circuit.

67. The apparatus of claim 66 wherein said first angle is not equal to said second angle.

68. The apparatus of claim 66 wherein said third angle is not equal to said fourth angle.

69. The apparatus of claim 66 wherein said first angle is substantially equal to one of said third angle and said fourth angle and said second angle is substantially equal to the other of said third angle and said fourth angle.

70. The apparatus of claim 66 wherein said second wire segment is substantially parallel to said fourth wire segment and said third wire segment is substantially parallel to said sixth wire segment.

71. The apparatus of claim 66 wherein said third wire segment substantially abuts said sixth wire segment.

72. The apparatus of claim 66 wherein said third wire segment is substantially parallel to and substantially abuts said sixth wire segment.

73. The apparatus of claim 66 wherein said first sensor and said second sensor define independent current paths.

74. The apparatus of claim 66 wherein said first sensor and said second sensor define a single current path.

75. The apparatus of claim 66 further comprising a switch in communication between said first sensor and said second sensor, said switch electrically connecting said first sensor and said second sensor to form a single current path when closed and electrically isolating said first sensor and said second sensor to form separate current paths when open.

76. The apparatus of claim 66 further comprising a controller in communication with said first sensor, said second sensor and said vehicle detection circuit, said controller selectively energizing said first sensor and said second sensor such that a lateral position within the roadway of a vehicle passing over each of said first sensor and said second sensor while energized is determined.

77. The apparatus of claim 66 further comprising a controller in communication with each of said first sensor and said second sensor, said controller for selectively energizing each of said first sensor and said second sensor.

78. The apparatus of claim 66 wherein the roadway further defines a surface, said first sensor and said second sensor being disposed substantially parallel to the roadway surface.

79. The apparatus of claim 66 wherein one of said second wire segment and said third wire segment substantially abuts one of said fourth wire segment and said sixth wire segment to define a common leg.

80. The apparatus of claim 79 wherein said vehicle detection circuit produces a first magnetic field in said first sensor that destructively interferes with a second magnetic field produced by said vehicle detection circuit in said second sensor along said common leg.

81. The apparatus of claim 79 wherein said vehicle detection circuit produces a first magnetic field in said first sensor that constructively interferes with a second magnetic field produced by said vehicle detection circuit in said second sensor along said common leg.

82. The apparatus of claim 66 further comprising:
 a third sensor configured in a substantially triangular arrangement including a seventh wire segment, an eighth wire segment substantially spanning the width of the roadway at a fifth angle relative to said seventh wire segment and a ninth wire segment substantially spanning the width of the roadway at sixth angle relative to said seventh wire segment wherein said seventh wire segment, said eighth wire segment and said ninth wire segment form a current path, said third sensor in communication with said vehicle detection circuit, said third sensor being disposed below and substantially concentric with said first sensor; and a fourth sensor configured in a substantially triangular arrangement including a tenth wire segment substantially spanning the width of the roadway, an eleventh wire segment and a twelfth wire segment substantially spanning the width of the roadway at a seventh angle relative to said eleventh wire segment, said tenth wire segment disposed at an eighth angle relative to said eleventh wire segment wherein said tenth wire segment, said eleventh wire segment and said twelfth wire segment form a current path, said fourth sensor in communication with said vehicle detection circuit, said fourth sensor being disposed below and substantially concentric with said second sensor.

83. The apparatus of claim 82 wherein one of said second wire segment and said third wire segment substantially abuts one of said fourth wire segment and said sixth wire segment to define a first common leg and one of said eighth wire segment and said ninth wire segment substantially abuts one of said tenth wire segment and said twelfth wire segment to define a second common leg.

84. The apparatus of claim 82 wherein said first sensor is substantially coplanar with said second sensor and said third sensor is substantially coplanar with said fourth sensor.

85. The apparatus of claim 83 wherein said vehicle detection circuit produces a first magnetic field in said first sensor that destructively interferes with, along said first common leg, a second magnetic field produced by said vehicle detection circuit in said second sensor.

86. The apparatus of claim 85 wherein said vehicle detection circuit produces a third magnetic field in said third sensor that destructively interferes with, along said second common leg, a fourth magnetic field produced by said vehicle detection circuit in said fourth sensor.

87. The apparatus of claim 85 wherein said vehicle detection circuit produces a third magnetic field in said third sensor that constructively interferes, along said second common leg, with a fourth magnetic field produced by said vehicle detection circuit in s,aid fourth sensor.

88. The apparatus of claim 83 wherein said vehicle detection circuit produces a first magnetic field in said first sensor that constructively interferes, along said first common leg, with a second magnetic field produced by said vehicle detection circuit in said second sensor.

89. The apparatus of claim 88 wherein said vehicle detection circuit produces a third magnetic field in said third sensor that destructively interferes with, along said second common leg, a fourth magnetic field produced by said vehicle detection circuit in said fourth sensor.

90. The apparatus of claim 88 wherein said vehicle detection circuit produces a third magnetic field in said third sensor that constructively interferes, along said second common leg, with a fourth magnetic field produced by said vehicle detection circuit in said fourth sensor.

91. An apparatus for detecting a vehicle travelling on a roadway having a width and defining a path of vehicular travel, said apparatus comprising:
a vehicle detection circuit;
a first sensor configured in a substantially triangular arrangement including at least a first wire segment, a second wire segment substantially spanning the width of the roadway at a first angle relative to the first wire segment and a third wire segment substantially spanning the width of the roadway at second angle relative to the first wire segment, a first end of said first wire segment electrically connected to said vehicle detection circuit, a second end of said first wire segment electrically connected to a first end of said second wire segment, a second end of said second wire segment electrically connected to a first end of said third wire segment, and a second end of said third wire segment electrically connected to said vehicle detection circuit; and
a second sensor configured in a substantially triangular arrangement including at least a first wire segment substantially spanning the width of the roadway, a second wire segment and a third wire segment substantially spanning the width of the roadway at a third angle relative to said second wire segment, said second sensor first wire segment disposed at a fourth angle relative to said second wire segment, a first end of said first wire segment electrically connected to said vehicle detection circuit, a second end of said first wire segment electrically connected to a first end of said second wire segment, a second end of said second wire segment electrically connected to a first end of said third wire segment, and a second end of said third wire segment electrically connected to said vehicle detection circuit.

92. The apparatus of claim 91 wherein said first angle is not equal to said second angle.

93. The apparatus of claim 91 wherein said third angle is not equal to said fourth angle.

94. The apparatus of claim 91 wherein said first angle is substantially equal to one of said third angle and said fourth angle and said second angle is substantially equal to the other of said third angle and said fourth angle.

95. The apparatus of claim 91 wherein said first sensor second wire segment is substantially parallel to said second sensor first wire segment and said first sensor third wire segment is substantially parallel to said second sensor third wire segment.

96. The apparatus of claim 91 wherein said first sensor third wire segment substantially abuts said second sensor third wire segment.

97. The apparatus of claim 91 wherein said first sensor third wire segment is substantially parallel to and substantially abuts said second sensor third wire segment.

98. The apparatus of claim 91 wherein said first sensor and said second sensor define independent current paths.

99. The apparatus of claim 91 wherein said first sensor and said second sensor define a single current path.

100. The apparatus of claim 91 further comprising a switch in communication between said first sensor and said second sensor, said switch electrically connecting said first sensor and said second sensor to form a single current path when closed and electrically isolating said first sensor and said second sensor to form separate current paths when open.

101. The apparatus of claim 91 further comprising a controller in communication each of said first sensor and said second sensor, said controller for selectively energizing each of said first sensor and said second sensor.

102. The apparatus of claim 91 wherein the roadway further defines a surface, said first sensor and said second sensor being disposed substantially parallel to the roadway surface.

103. An apparatus for detecting a vehicle travelling on a roadway having a width and defining a path of vehicular travel, said apparatus comprising:
means for generating an inductive field;
means for sensing changes in said inductive field when a vehicle is present, said means for sensing changes in said inductive field adapted to detect each wheel of a vehicle independently; and means for recording said changes in said inductive field due to each wheel of a vehicle as a wheel spike;

means for recording an occurrence time for each said wheel spike;

means for producing an inductive signature based on each said wheel spike and said occurrence time for each said wheel spike.

104. The apparatus of claim 103 further comprising means for selectively energizing said means for generating said inductive field and said means for sensing changes in said inductive field.

105. The apparatus of claim 103 further comprising means for determining a lateral position of a vehicle.

106. The apparatus of claim 103 further comprising means for preventing breakage of said means for sensing changes due to expansion of said roadway.

107. The apparatus of claim 103 further comprising means for classifying the vehicle represented by said inductive signature.

108. The apparatus of claim 103 further comprising means for separating a composite inductive signature that includes a combined plurality of inductive signatures simultaneously obtained into a plurality of individual vehicle inductive signatures.

109. A method for installing an inductive sensor, said method comprising the steps of:

(a) cutting a channel for receiving a wire, said channel defining a depth and a length; and (b) varying said channel depth along said channel length.

110. The method of claim 109 wherein said step of varying said channel depth along said channel length includes the step of varying said channel depth in an undulating pattern.

111. An inductive sensor deployed in a roadway for use with a vehicle detector the roadway having a width and a surface, said inductive sensor comprising:

at least one channel cut into the roadway surface, said at least one channel defining a bottom located at a depth and having a length, said channel depth varying over said channel length; and a wire disposed within said channel along said channel bottom, said wire defining a loop for detecting variations in an inductive field caused by a metallic object located proximate to said loop;

wherein said varying channel depth necessitates a length of wire in excess of said length of any said at least one channel such that said wire is not broken by expansion of the roadway.

112. The inductive sensor of claim 111 wherein said channel depth oscillates over said channel length.

113. The inductive sensor of claim 111 wherein said channel depth undulates over said channel length.

114. The inductive sensor of claim 111 wherein said channel bottom defines a wavy surface.

115. The inductive sensor of claim 111 wherein said channel bottom defines an undulating surface.

116. A method of determining vehicle parameters comprising the steps of:

(a) installing at least one inductive sensor in a known geometric configuration;

(b) connecting said at least one inductive sensor to at least one vehicle detection circuit;

(c) connecting each said at least one vehicle detection circuit to a processing device;

(d) detecting each wheel of a vehicle crossing over said at least one inductive sensor as a wheel spike;

(e) recording an occurrence time for each said wheel spike; and (f) correlating said occurrence time for each said wheel spike with said known geometric configuration of said at least one inductive sensor to determine at least one vehicle parameter.

117. A method of re-identifying a vehicle travelling along a roadway containing a plurality of inductive sensors in communication with a common processing device, said method comprising the steps of:

(a) detecting at least one wheel spike of a vehicle crossing over one of said plurality of inductive sensors as a first inductive signature;

(b) detecting at least one wheel spike of a vehicle subsequently crossing over another of said plurality of inductive sensors as a second inductive signature;

(c) comparing at least one wheel spike of said first inductive signature with a corresponding wheel spike of said second inductive signature;

(d) identifying the vehicle represented by said first inductive signature as being identical to the vehicle represented by said second inductive signature when said corresponding wheel spike substantially matches.

118. The method of claim 117 wherein said step of identifying the vehicle represented by said first inductive signature as being identical to the vehicle represented by said second inductive signature further comprises the step of correlating said first inductive signature with said second inductive signature using a wheelbase measurement.

119. The method of claim 117 wherein said step of identifying the vehicle represented by said first inductive signature as being identical to the vehicle represented by said second inductive signature further comprises the step of correlating said first inductive signature with said second inductive signature using a tire width measurement.

120. The method of claim 117 wherein at least one of said step of detecting at least one wheel spike of a vehicle crossing over one of said plurality of inductive sensors as a first inductive signature and said step of detecting at least one wheel spike of a vehicle subsequently crossing over another of said plurality of inductive sensors as a second inductive signature further comprises the step of recording an occurrence time for said at least one wheel spike.

121. The method of claim 117 further comprising the step of assuming the vehicle defines a wheelbase having a substantially rectangular geometry.

122. The method of claim 117 further comprising the step of normalizing each of said first inductive signature and said second inductive signature with respect to speed.

123. The method of claim 117 wherein said step of detecting at least one wheel spike of a vehicle crossing over one of said plurality of inductive sensors as a first inductive signature includes the steps of (i) detecting a first wheel spike for a wheel of a vehicle crossing over a first road-traversing leg of one of said plurality of inductive sensors; and (ii) detecting a second wheel spike for a wheel of a vehicle crossing over a second road-traversing leg of one of said plurality of inductive sensors.

* * * * *